Jan. 23, 1951

J. H. ANDRESEN, JR 2,538,824

PRESSURE RATIO SYSTEM

Filed May 8, 1947

INVENTOR.
JOHN H. ANDRESEN Jr.
BY
Myron J. Seibold
ATTORNEY

Jan. 23, 1951   J. H. ANDRESEN, JR   2,538,824
PRESSURE RATIO SYSTEM
Filed May 8, 1947   3 Sheets-Sheet 3

INVENTOR.
JOHN H. ANDRESEN jr.
BY Myron J. Seibold
ATTORNEY

Patented Jan. 23, 1951

2,538,824

UNITED STATES PATENT OFFICE 2,538,824

PRESSURE RATIO SYSTEM

John H. Andresen, Jr., Port Washington, N. Y., assignor to Square D Company, Detroit, Mich., a corporation of Michigan Application May 8, 1947, Serial No. 746,755

15 Claims. (Cl. 73—407)

This invention relates to a pressure ratio system and to the use of force moment comparison for indication and control.

An object of the invention is the provision of a pressure ratio system using a floating lever having an arcuate surface cooperating with an oscillatable fulcrum arm pivoted at the center of development of the surface with the pressure forces acting on the lever radially of the surface so that there is no resultant force tending to rotate or oppose rotation of the fulcrum arm.

Another object of the invention is the provision of a pressure ratio indicator utilizing a system in accordance with the preceding object with the fulcrum arm automatically movable to balance the force moments acting on the lever and with an indicator responsive to fulcrum arm position to provide a reading of the pressure ratio.

Another object of the invention is the provision of the remote indicator for a condition responsive variable utilizing a system in accordance with the first object in which the fulcrum arm is movable in response to the condition responsive variable and indicates the variation in the condition at a remote point by measurement of the change in a pressure acting on the lever which restores the balance of the force moment after fulcrum arm movement.

Another object of the invention is the provision of an automatic flow ratio control utilizing a system in accordance with the first object to maintain a constant ratio between two fluid flows.

Other objects and features of the invention will be readily apparent to those skilled in the art from the specification and appended drawings illustrating certain preferred embodiments in which.

Figure 1:
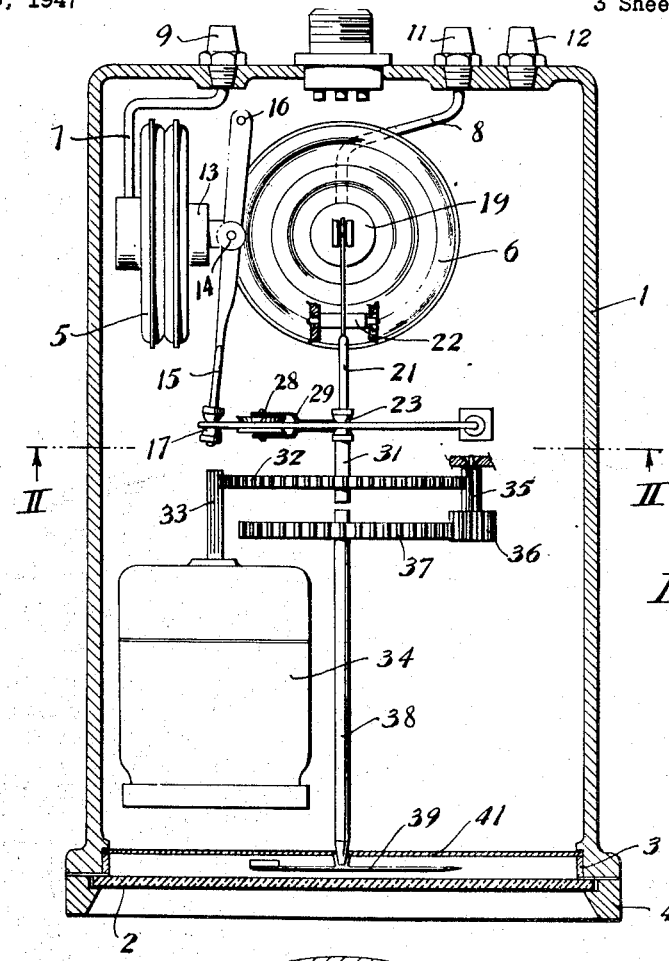
Fig. 1 is a partly diagrammatic plan view of a pressure ratio indicator using the system of the present invention.

The pressure ratio indicator and system illustrated in Figure 1 comprises an outer casing 1 closed by a transparent glass 2 pressed against a sealing gasket 3 by a bezel ring 4. Within the casing 1 are mounted a pair of sets of diaphragm capsules 5 and 6 having the interiors connected through tubes 7 and 8 to pressure connectors 9 and 11. Pressure connector 12 communicates with the interior of casing 1 to establish therein any desired basic pressure such as atmospheric pressure. The movable end 13 of the diaphragm capsule 5 is pivotally connected at 14 to a lever 15 having a fixed pivot 16 and pivoted at 17 to one end of a floating lever member 18. The movable end 19 of the diaphragm capsule 6 is pivotally connected to one end of a lever 21 having a fixed pivot 22 and pivotally connected at 23 to the lever 18. The lever 18 is provided with an extension arm 24 carrying a contact 25 adapted to cooperate with a stationary contact 26.

The lever 18 has an arcuate surface 27 along which rolls a roller 28 mounted at the end of a fulcrum arm 29 fixed to a shaft 31 whose axis coincides with the center of development of the surface 27. Also fixed to the shaft 31 is a gear wheel 32 adapted to be driven by the gear shaft 33 of a reversible motor 34. Rotation of the wheel 32 is amplified through the gear system 35, 36 and 37 to drive a shaft 38 carrying a pointer 39 disposed in front of a dial 41 bearing suitable indicia of pressure ratio.

It will be noted that the forces applied to the lever 18 through the levers 15 and 21 are directed radially of the surface 27 and that the axis of the fulcrum lever 29 is also disposed at the center of development of the surface 27. Hence, the force acting through the fulcrum roller 28 upon the fulcrum arm 29 is at all times radial regardless of the relative values of the applied forces and regardless of the position of the fulcrum with respect to the points of force application. Hence, there are no resultant forces tending to rotate or oppose rotation of the arm 29 and the only opposition to its rotation is the frictional resistance of the bearings of roller 28 and shaft 31.

Figure 2:
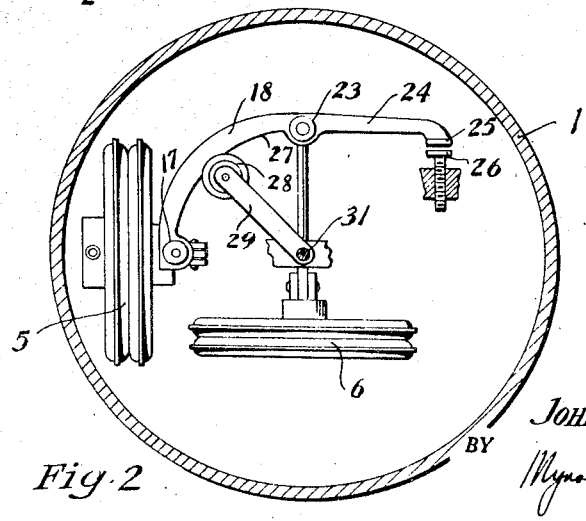
Fig. 2 is a sectional view on the line II—II of Figure 1.

In the indicator of Figs. 1 and 2 the contacts 25 and 26 are connected in a manner, not shown, to effect rotation of motor 34 in one direction when the contacts are engaged and in the reverse direction when the contacts are disengaged. While any desired control circuit may be used, one that is suitable is illustrated in applicant's copending application, Serial No. 644,136 filed January 29, 1946, for Motor Control, now Patent No. 2,437,064.

The operation of the device of Figs. 1 and 2 is to position the fulcrum arm 29 so that the force moments about the fulcrum are equalized, this occurring just at the make-break point of the contacts 25, 26. It will, of course, be understood that the pressure connectors 9 and 11 are connected to the sources of pressure whose ratio is to be indicated and the pressure connector 12 to the base pressure or to atmosphere. With the pressure moments balanced, if the pressure in diaphragm capsule 5 increases without a corresponding increase in pressure within diaphragm capsule 6, the pressure moments become unbalanced to move the arm 24 in a counterclockwise direction to disengage contacts 25 and 26. This will cause rotation of the motor 34 in one direction to rotate gear wheel 32 and shaft 31 to rotate the fulcrum arm 29 in a counterclockwise direction until the force moments are again balanced and the contacts return to the make-break point. This rotation of the gear wheel 32 will, through gear train 35, 36, 37, rotate shaft 38 and pointer 39 to indicate the new pressure ratio corresponding to the new setting of the fulcrum arm 29. Similarly, if the pressure in diaphragm capsule 6 increases without a corresponding increase in the pressure in diaphragm capsule 5, the contacts 25, 26 are closed to rotate motor 34 in the opposite direction to rotate fulcrum arm 29 in a clockwise direction to balance the force moments. Again the rotation of the fulcrum arm 29 produces a proportional rotation of the pointer 39 to indicate the pressure ratio.

Figure 3:
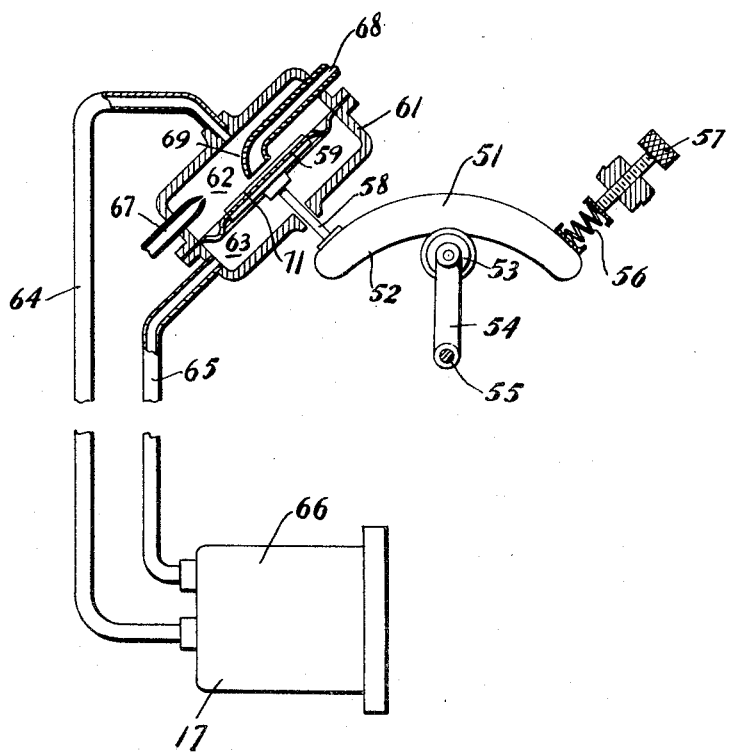
Fig. 3 is a diagrammatic representation of a remote indicator utilizing the pressure ratio system.

In Figure 3, the pressure ratio system has been shown applied to the remote indication of a variable condition or position. Here the floating fulcrum lever is indicated at 51 and is provided with an arcuate surface 52 with which cooperates a roller 53 on fulcrum arm 54 mounted upon a shaft 55 whose axis coincides with the center of development of the surface 52. One end of the fulcrum lever 51 is adjustably biased by a spring 56 having a tension adjusting knob 57. The opposite end of the lever 51 engages a pin 58 controlling the position of a diaphragm 59 disposed within a chamber 61 and dividing it into two compartments 62 and 63. The interiors of chambers 62 and 63 are connected through the tubing 64 and 65 to a differential pressure gage 66. Chamber 62 is provided with an inlet 67 for a source of fluid pressure and an outlet 68. The interior end of the outlet 68 is in the form of a valve seat 69 cooperating with a valve plate 71 on the diaphragm 59 to regulate the effective outlet orifice from chamber 62.

In the apparatus of Figure 3, the instrument 66 indicates by its reading the position of the fulcrum arm 54 and hence the position or condition of the remote variable which controls the positioning of the fulcrum arm. Adjustment of the tension of spring 56 by knob 57 determines the zero setting for the device. The pressure within chamber 63 is that of the atmosphere in which the housing 61 is placed. The pressure within the chamber 62 will vary depending upon the position of the diaphragm 59, assuming a substantially constant source of pressure from the inlet 67. The moments of the forces about the fulcrum arm 54 will be equalized through slight movement of the pin 58 to increase or decrease the pressure within chamber 62. In this system again there is substantially no resultant force acting to rotate or oppose rotation of the fulcrum arm 54 so that the only resistance to its rotation is that provided by the friction of the bearings of its shaft 55 and roller 53. Thus, the fulcrum lever 54 may be accurately positioned by sensitive condition responsive elements. When it is so positioned, the diaphragm 59 will move to establish a pressure differential between chambers 62 and 63 to apply the force on the pin 58 necessary to balance the force moments acting on the fulcrum lever 51. As the differential pressure instrument 66 measures the pressure difference between the pressures in chambers 62 and 63, it will by its value directly indicate the position of the fulcrum lever 54 and hence the position or value of the variable remote condition.

Figure 4:
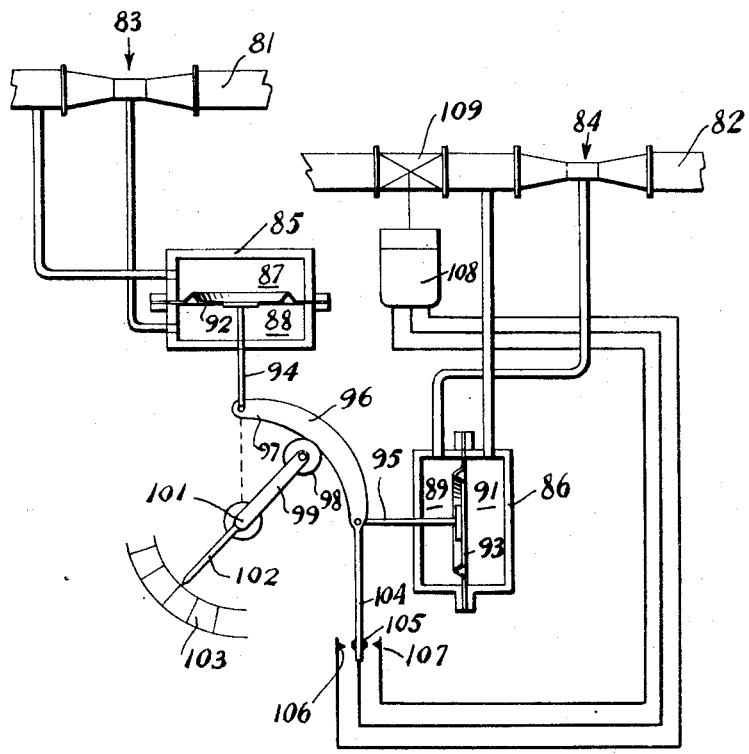
Fig. 4 is a diagrammatic representation of the flow ratio control.

In the apparatus of Figure 4, the pressure ratio system is utilized in an automatic flow ratio control. The flows whose ratios are to be controlled are those within the conduits 81 and 82 in which are placed Venturis 83 and 84. There are provided a pair of housings 85 and 86 divided into separate chambers 87, 88 and 89, 91 by movable diaphragms 92, 93. The diaphragms 92 and 93 are connected through rods 94 and 95 to the fulcrum lever 96 having an arcuate surface 97 with which cooperates the roller 98 on the fulcrum arm 99 pivoted at 101 and provided with a pointer extension 102 cooperating with a dial 103. Again the center of rotation of the fulcrum lever 99 is at the center of development of the surface 97 and the forces exerted on rods 94 and 95 by the diaphragms 92 and 93 are directed radially of the surface 97. The chambers 87 and 91 are connected to the conduits 81 and 82 and the chambers 88 and 89 are connected to the throats of Venturis 83 and 84. Hence, the pressure differentials within the housings 85, 86 and the forces acting on the diaphragms 92 and 93 are determined by the rates of fluid flow through the conduits 81 and 82. The fulcrum lever 96 has an extending arm 104 carrying a double contact 105 adapted to cooperate with a pair of stationary contacts 106 and 107 to effect the reversing control of a servomotor 108 for a valve 109 in the conduit 82. The ratio desired between the flows in conduits 81 and 82 is determined by the position of the fulcrum arm 99 which is set to the ratio to be maintained. Thereafter, any variation in the ratio of rates of flow will effect movement of the contact 105 to effect operation of the servomotor to control the valve 109 and restore the ratio of rates of flow to the set value.

In the indicator of Figures 1 and 2 and the flow ratio control of Figure 4, the lack of resistance to rotation of the lever arm 99 is not as important as in the remote indicator of Figure 3 since any force required to move the lever arm may be made available. However, the arcuate construction simplifies the pressure ratio system by providing a simple rotational movement for the fulcrum arm without backing up on the means applying the forces to the fulcrum lever and also minimizes the force required for fulcrum arm movement.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a pressure ratio system, a floating member having an arcuate surface, a rotatable fulcrum arm cooperating with said arcuate surface and pivoted at the center of development thereof, means responsive to the pressures whose ratio is to be determined connected to direct their forces at opposite sides of said fulcrum arm and substantially radially of said surface whereby substantially no resultant force acts to effect rotation of said arm in any position thereof between the points of said forces.

2. A pressure ratio system comprising a floating member having an arcuate surface, a rotatable fulcrum arm cooperating with said arcuate surface and pivoted at the center of development thereof, means responsive to the pressures whose ratio is to be determined for applying forces to said member at opposite sides of the point of engagement of the fulcrum arm with said surface and with said forces directed substantially radially of the surface whereby the angular position of the fulcrum arm determines the moments of the forces acting on said member about the fulcrum provided by the engagement of said arm with the arcuate surface.

3. A pressure ratio system comprising a floating member having an arcuate surface, a rotatable fulcrum arm cooperating with said arcuate surface and pivoted at the center of development thereof, means responsive to the pressures whose ratio is to be determined for applying forces to said member at opposite sides of the point of engagement of the fulcrum arm with said surface and with said forces directed substantially radially of the surface whereby the angular position of the fulcrum arm determines the moments of the forces acting on said member about the fulcrum provided by the engagement of said arm with the arcuate surface, there being substantially no resultant force tending to rotate said fulcrum arm whereby rotation thereof is effected against substantially bearing friction only.

4. A pressure ratio system comprising a floating member having an arcuate surface, a rotatable fulcrum arm carrying a roller against which said surface bears, said arm being pivoted at the center of development of said surface, means responsive to the pressures whose ratio is to be determined connected to apply forces to said member at opposite sides of the engagement of the roller with the surface and with the forces directed substantially radially of the surface, whereby there is substantially no resultant rotational force applied to said fulcrum arm by said pressure responsive means and rotation of the lever is effected against substantially bearing friction only.

5. A pressure ratio system comprising a floating member having an arcuate surface, a rotatable fulcrum arm carrying a fulcrum roller against which said surface bears, said arm being pivoted at the center of development of said surface, means responsive to said pressures connected to apply forces to said member at opposite sides of the engagement of the roller with the surface and with the forces directed substantially radially of the surface, whereby the ratio of the forces applied to said member determines the angular position of the fulcrum arm required to effect balance of the force moments about the fulcrum.

6. A pressure ratio indicator comprising a floating member having an arcuate surface, a rotatable fulcrum arm cooperating with said surface and pivoted at the center of development thereof, a pair of elements responsive to the pressures whose ratio is to be indicated, means connecting said elements to said floating member at opposite sides of the engagement of said fulcrum arm with said arcuate surface and so as to direct the forces exerted by said elements substantially radially of said surface, a motor connected to drive said fulcrum arm in opposite directions, means controlled by the balance of the force moments on said floating member about said fulcrum arm for controlling the direction of rotation of said motor, and calibrated means for indicating the position of said fulcrum arm to indicate the pressure ratios as the fulcrum arm is rotated to balance the force moments thereabout.

7. A pressure ratio indicator comprising a floating member having an arcuate surface, a rotatable fulcrum arm cooperating with said surface and pivoted at the center of development thereof, a pair of elements responsive to the pressures whose ratio is to be indicated, means connecting said elements to said floating member at opposite sides of the engagement of said fulcrum arm with said arcuate surface and so as to direct the forces exerted by said elements substantially radially of said surface, a motor connected to drive said fulcrum arm in opposite directions, means controlled by the balance of the force moments on said floating member about said fulcrum arm for controlling the direction of rotation of said motor, a dial calibrated in units of pressure ratio, a pointer cooperating with said dial, and means for rotating said pointer as said fulcrum arm is rotated to balance the force moments thereabout whereby the position of the pointer relative to said indicia directly indicates the pressure ratio.

8. A pressure ratio indicator comprising a floating member having an arcuate surface, a rotatable fulcrum arm cooperating with said surface and pivoted at the center of development thereof, a pair of elements responsive to the pressures whose ratio is to be indicated, means connecting said elements to said floating member at opposite sides of the engagement of said fulcrum arm with said arcuate surface and so as to direct the forces exerted by said elements substantially radially of said surface, a motor connected to drive said fulcrum arm in opposite directions, means controlled by the balance of the force moments on said floating member about said fulcrum arm for controlling the direction of rotation of said motor, means for directly indicating pressure ratio, and means for driving said indicating means from said motor as said fulcrum arm is rotated to directly indicate changes in pressure ratio as the angular position of the fulcrum lever changes to balance the force moments thereabout.

9. A pressure ratio indicator comprising a floating member having an arcuate surface, a rotatable fulcrum arm cooperating with said surface and pivoted at the center of development thereof, a pair of elements responsive to the pressures whose ratio is to be indicated, means connecting said elements to said floating member at opposite sides of the engagement of said fulcrum arm with said arcuate surface and so as to direct the forces exerted by said elements substantially radially of said surface, a motor connected to drive said fulcrum arm in opposite direction, at least two electrical contacts controlling the direction of rotation of said motor, means controlling the engagement and dis-engagement of said contacts from the position of said floating member as determined by the balance and unbalance of the force moments thereon, whereby unbalance in said force moments caused by variation in the pressure ratio effects rotation of said fulcrum arm to return said force moments into balance, and pressure ratio indicating means movable in response to rotation of said fulcrum arm to indicate by its position the pressure ratio to be measured.

10. In a remote indicator, a floating member having an arcuate surface, a rotatable fulcrum arm cooperating with said arcuate surface and pivoted at the center of development thereof, means applying a biasing force to said arcuate member at one side of said fulcrum arm with said force directed substantially radially of said surface, a source of fluid pressure variable in response to a pressure exerted thereon, means connecting said variable pressure source to said floating member at the opposite side of said fulcrum arm with a reactive force on said member directed substantially radially of said surface, means for determining the position of said fulcrum arm in accordance with a variable condition, and a remote pressure responsive instrument connected to said variable pressure source and calibrated to indicate the condition.

11. In a remote indicator, a floating member having an arcuate surface, a rotatable fulcrum arm cooperating with said arcuate surface and pivoted at the center of development thereof, means applying a biasing force to said arcuate member at one side of said fulcrum arm with said force directed substantially radially of said surface, a source of fluid pressure variable in response to a pressure exerted thereon, means connecting said variable pressure source to said floating member at the opposite side of said fulcrum arm with a reactive force on said member directed substantially radially of said surface, means for determining the position of said fulcrum arm in accordance with a variable condition, and a remote pressure responsive instrument connected to said variable pressure source and calibrated to indicate the condition, said biasing force being adjustable to determine the zero setting for instrument calibration.

12. In a remote indicator, a floating member having an arcuate surface, a rotatable fulcrum arm cooperating with said arcuate surface and pivoted at the center of development thereof, means applying a biasing force to said arcuate member at one side of said fulcrum arm with said force directed substantially radially of said surface, a remote pressure responsive instrument calibrated to indicate the condition of a responsive means, means connecting said pressure responsive instrument to said floating member at the opposite side of said fulcrum arm so as to direct a reactive force on said member substantially radially of said surface, and means for rotating said fulcrum arm in accordance with variation in the condition of the responsive means to indicate the condition on the remote instrument.

13. In a remote indicator, a floating member having an arcuate surface, a rotatable fulcrum arm cooperating with said arcuate surface and pivoted at the center of development thereof, means applying a biasing force to said arcuate member at one side of said fulcrum arm with said force directed substantially radially of said surface, a remote pressure responsive instrument calibrated to indicate the condition of a responsive means, means for connecting said instrument to said floating member on the opposite side of said fulcrum arm so as to exert a reactive force on the member directed substantially radially of said surface, and means connecting said responsive means so that its condition determines the position of the fulcrum arm.

14. A flow ratio control system comprising pressure means responsive to the rates of flow whose ratio is to be controlled, a floating member having an arcuate surface, a rotatable fulcrum arm cooperating with said arcuate surface and pivoted at the center of development thereof, means connecting said pressure responsive means to said floating member at opposite sides of said fulcrum arm and so that the forces exerted by said means are directed substantially radially of said surface, means for controlling at least one of said rates of flow, and means responsive to unbalance of force moments on said member about said fulcrum arm for controlling the flow rate control means to automatically maintain a predetermined ratio of rates of flow.

15. A flow ratio control system comprising pressure means responsive to the rates of flow whose ratio is to be controlled, a floating member having an arcuate surface, a rotatable fulcrum arm cooperating with said arcuate surface and pivoted at the center of development thereof, means connecting said pressure responsive means to said floating member at opposite sides of said fulcrum arm and so that the forces exerted by said means are directed substantially radially of said surface, means for controlling at least one of said rates of flow, and means responsive to unbalance of force moments on said member about said fulcrum arm for controlling the flow rate control means to automatically maintain a predetermined ratio of rates of flow, the angular position of said fulcrum arm determining the ratio of flow rates to be automatically maintained by the system.

JOHN H. ANDRESEN, Jr.

REFERENCES CITED

The following references are of record in the file of this patent:

UNITED STATES PATENTS

| Number | Name | Date |
|---|---|---|
| 1,415,710 | Richter | May 9, 1922 |
| 2,059,151 | Smith | Oct. 27, 1936 |
| 2,225,768 | Clench et al. | Dec. 24, 1940 |
| 2,272,950 | Mercier | Feb. 10, 1942 |
| 2,410,335 | Burdick | Oct. 29, 1946 |
| 2,450,772 | Watkins | Oct. 5, 1948 |